United States Patent [19]

Zubrycki

[11] 3,999,293

[45] Dec. 28, 1976

[54] CUTTING DEVICE

[76] Inventor: Theodore Zubrycki, 30 Sanger St., Bridgewater, Mass. 02324

[22] Filed: Aug. 18, 1975

[21] Appl. No.: 605,725

[52] U.S. Cl. .................................... 30/124; 17/25

[51] Int. Cl.[2] .......................................... A22C 9/00

[58] Field of Search ............ 30/114, 124, 358, 363, 30/165, 173; 17/25

[56] References Cited

UNITED STATES PATENTS

| | | | |
|---|---|---|---|
| 2,552,046 | 5/1951 | Justice | 17/25 |
| 2,675,580 | 4/1954 | Pesce | 30/124 X |
| 3,095,603 | 7/1963 | May | 17/25 |

*Primary Examiner*—Al Lawrence Smith
*Assistant Examiner*—J. C. Peters

[57] ABSTRACT

A simple cutting device in two sections which closes against itself slicing at prearranged angles and depth sausages and hotdogs and the like placed therein producing a spiral cut in the hotdog or sausage the entire length of the unit.

3 Claims, 3 Drawing Figures

CUTTING DEVICE

This invention relates to a device which is used in connection with preparation of food for cooking and in particular hotdogs and sausages or frankfurters which must be cut.

In preparing sausages and hotdogs and the like for cooking the shell of skin must be pierced in order to prevent the unit from distorting. While being cooked they build up an internal pressure and blister and thereby present an unappetizing appearance. Furthermore when the skin is ruptured while cooking a hotdog or sausage can cause injury due to the exploding force and cooking oils.

It has been discovered that cutting hotdogs or sausages requires more than one perferation. They must be spaced fairly cloe to one another in order to prevent the sausage or hotdog from exploding in any one section. It appears the gas is trapped within the skin and the skin must be perforated to properly vent it in more than one location in order to prevent distortion or explosion. It was discovered that a spiral cut the entire length of the unit provided the most consistent and best result.

It is also observed that if a sausage is sliced or cut in a careless manner even though the unit does not explode it will have an unappetizing appearance as a result of the cutting whereas the overall purpose of cutting the sausage will have been defeated.

Many devices have been suggested and fabricated for cutting hotdogs and perforating the skin in order to let the gases escape. However, those which presented an edible product after is was cooked were quite complicated and quite expensive; and therefore never gained commercial acceptance. This inventor has developed such a device and owing to expense and complicated matter was not successful in gaining any significant market. The new device has achieved the ultimate in simplicity while obtaining all of the required goals of perforating the hotdog at select points equal distance along the hotdog and at an angle which makes the hotdog quite appetizing in appearance once cooked.

Therefore an object of the present invention is to provide a simple sausage cutting device.

Another object of the present device is to provide a sausage or hotdog cutting device which spaces venting cuts at appetizing distances along the sausage or hotdog.

Another object of the present invention is to provide a simple hand operated cutting device for hotdogs which can be cleaned easily.

Another object of the present device is to provide a hotdog or sausage cutter which is inexpensive in fabrication.

Other objects, features, and advantages of the present invention will be better understood from the following detailed specifications especially when read in conjunction with the attached drawings of which:

Figure 1:
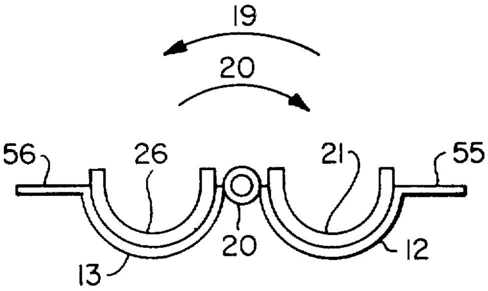
FIG. 1 is an end view of the present invention.

Referring to FIG. 1, we see the sausage cutting device. Sections 12 and 13 close together by hinge 20 as indicated by arrows 19 and 20. Blades 21 and 26 are therefore caused to come in cutting contact with the sausage placed between the two blades. By means of projecting edges or handles 55 and 56, the unit is then again separated and the hotdog or sausage removed. It is to be noted the edges 12 and 13 are slightly oval not round. This permits relatively dulled blades to perforate the hotdog by means of the added pressure.

Figure 2:
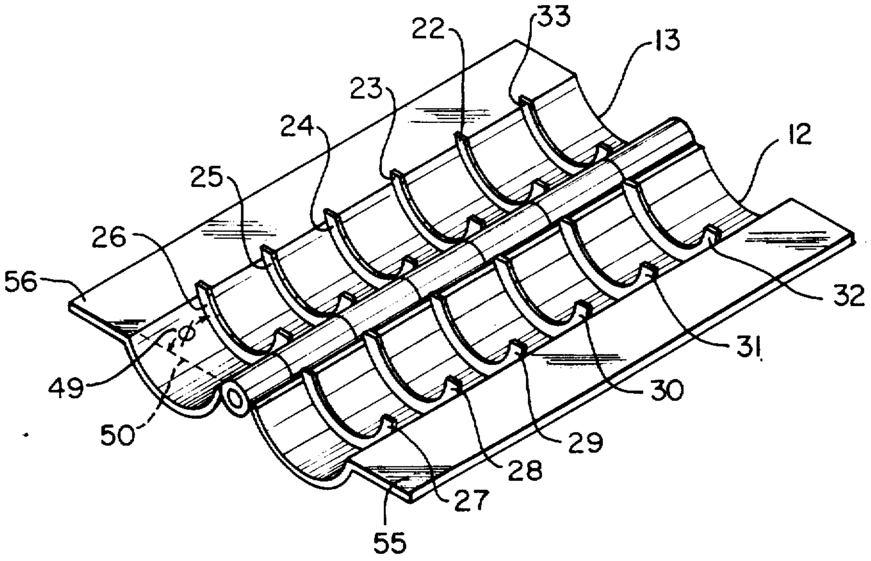
FIG. 2 is a prospective view of the present invention.

Referring now to FIG. 2, we see the hotdog slicer in greater detail. Sections 12 and 13 are open and are shaped to accommodate the round contour of a sausage or hotdog. Hinge 20 permits the units 12 and 13 to rotate about one another. We note that blades are six in number 26, 27 and so forth on each side. They are spaced opposing blades on unit 12. ie, 31, 32 and so forth. When the units swing close the blades are spaced opposite one another such that they slice the hotdog or sausage as a spiral the entire length. The distance between each blade is an important factor. As was alluded to earlier the hotdog or sausage can explode if they are not perforated at given distances. The optimum distance between blades on the same unit is ¾ of an inch at 27°, which causes a spiral cut. Accordingly with the blades being equally spaced above and below the unit, a slice is placed in the hotdog or sausage in the form of a ¾ of an inch spiral the entire length.

As important as the spacing is the angle in which the cut is placed in the hotdog. Angle $\phi$ 49 is approximately 27° with line 50 which is parallel to the edge of unit 13. Both sets of blades are in the sample angle with respect to one another such that their slices will all be parallel to one another. The angle and spacing of the slices present a very pleasing and appetizing arrangement in the cooked hotdog or sausage. The hinge 20 has two curved parts for each units equally spaced along the pin within the hinge 20. Pairs of blades such as 22 and 23 extend up into the hinge whereby a continuous spiral is attained because these two blades meet with opposing blades 30 and 29. This is repeated with all six interfitting blades providing a continuous spiral the entire length of the actual hotdog or sausage.

Figure 3:
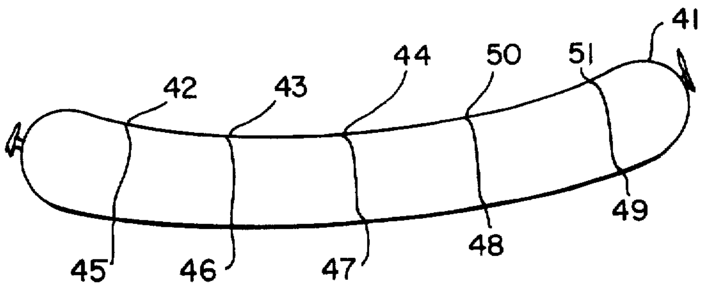
FIG. 3 is a view of a hotdog that has been cut with a spiral cut running the length of the hotdog.

Referring now to FIG. 3 we see a hotdog 41 that has slices in it, 42, 43 on one side and 45, 47 and so forth on the other side. The cutting of these hotdogs has been accomplished after innumerable hours of research and experimentation. The spacing of the slices are very important. The cutting on opposing sides is also very important. The angle again is an important factor. Accordingly, a device which cuts a sausage or hotdog within the prescribed distances alluded to above at approximately the same angle and on opposite sides of the hotdog or sausage will be more desirable and if as in this instance a spiral cut is made with interfitting blades the entire length, the hotdog will never blister or explode.

The hotdog slicer can be made of many materials however chrome steel or even stainless steel is to be preferred because of its ability to be cleaned and utilized repeatedly. The cuttingedges with sausages and hotdogs do not have to be that sharp initially but they should be of such materials that they do not deteriorate after washing such that they will be useful over and over again. The hinge connection 20 is simply a rod with the steel forming the cutting edge wrapped about it at two parts per unit. The unit therefore lends itself to stamping and can therefore be made very cheaply. Two separate parts are stamped out and the hinge rod 20 set between them assembling a single unit. The user then can wash it as he would any item of cutlery and place it in a folded condition with the rest of his cutlery which prevents any injury to the user because the blades are internal. The ultimate in simplicity has been attained in the fabrication of this device and its costs are accordingly in line with its simplicity. Plastic can be used, but would have to be cost. Presently a single stamping for steel units is utilized with great results.

Although I have described my invention with reference to a specific apparatus, I do not wish to be limited thereby I only wish to be limited by the appended claims of which.

I claim:

1. A cutting device comprising, a first elongated oval shaped support surface having thereon spiral spaced inwardly extending blades, said first surface being hingedly connected to a second interfitted elongated oval support surface having thereon spiral spaced inwardly facing blades, said hingedly connected cutting blades pivot about one another cutting hot dogs or sausages placed therebetween.

2. A cutting device according to claim 1 whereby the blades on the blades on each support surface interfit with one another producing a spiral cut in hotdogs and sausages placed therein.

3. A cutting device according to claim 2 wherein pairs of cutting blades extend into the hinge whereby pairs of interfitted opposing blades produce a continuous spiral cut in the hotdog or sausage.

* * * * *